United States Patent [19]
France et al.

[11] 3,794,383
[45] Feb. 26, 1974

[54] TILTING DUMP TRUCK MUD FLAP ASSEMBLY

[75] Inventors: Jimmie J. France, Roanoke; Fred J. Neubert; Eugene L. Caldwell, both of Peoria; Howard D. Springer; Max E. Sutton, both of Washington, all of Ill.

[73] Assignee: Westinghouse Air Brake Company, Peoria, Ill.

[22] Filed: May 24, 1972

[21] Appl. No.: 256,603

[52] U.S. Cl............ 298/1 SG, 280/154.5 R, 293/1, 293/69 R, 298/17
[51] Int. Cl..... B60p 1/16, B62d 25/18, B65g 67/24
[58] Field of Search.. 280/154.5 R; 293/1, 69, 69 R; 298/1 SG, 17

[56] References Cited
UNITED STATES PATENTS

| | | | |
|---|---|---|---|
| 2,721,760 | 10/1955 | Lapham et al. | 298/1 SG |
| 3,580,604 | 5/1971 | Overend | 298/1 SG |
| 3,195,921 | 7/1965 | Robinson | 280/154.5 R |
| 2,653,846 | 9/1953 | Wiley | 298/1 SG |

Primary Examiner—Robert G. Sheridan
Assistant Examiner—Howard Beltram
Attorney, Agent, or Firm—Robert J. Eck

[57] ABSTRACT

A mud flap assembly for a dump truck or the like having: an upper flap mounted to the dump box; and a lower flap carried by a support element which is suspended by flexible members from the dump box and is connected to the vehicle frame by a pair of spaced rockable members carrying stops for limiting the downward movement of said support element, and hence the lower flap, when the dump box is raised for unloading.

10 Claims, 6 Drawing Figures

PATENTED FEB 26 1974 3,794,383
SHEET 1 OF 2
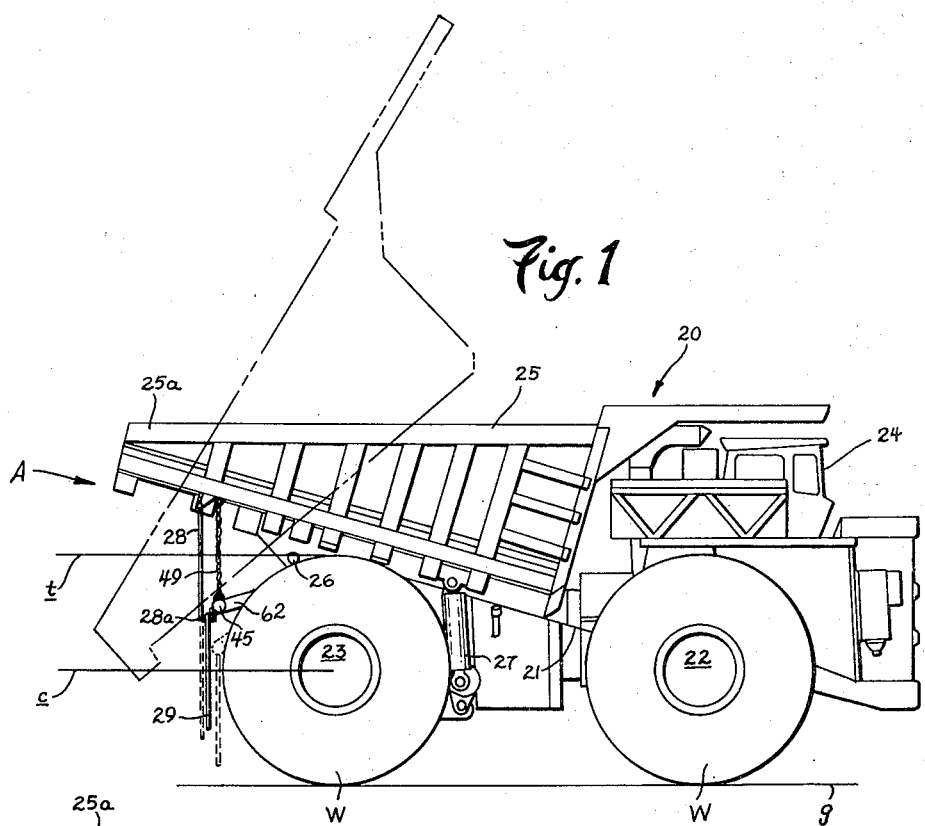
Fig. 1
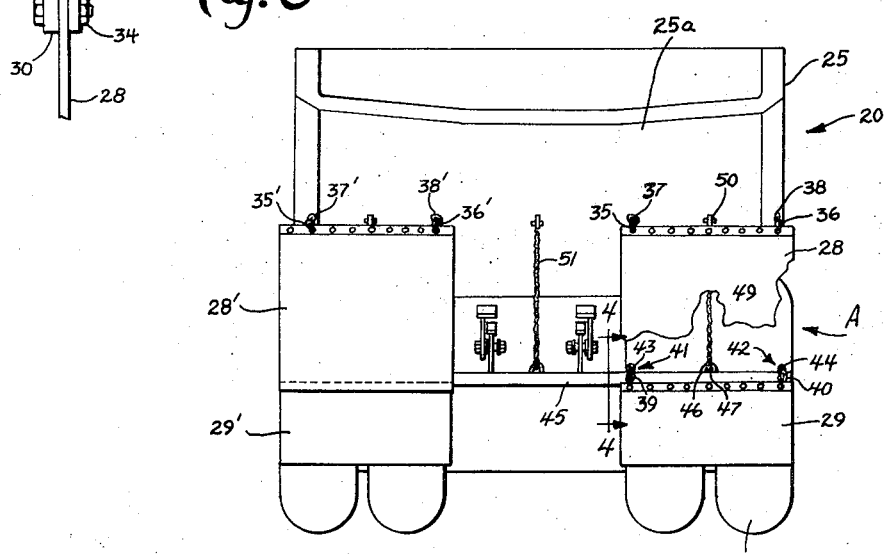
Fig. 3
Fig. 2

TILTING DUMP TRUCK MUD FLAP ASSEMBLY

BACKGROUND AND SUMMARY OF INVENTION

The present invention relates to dump trucks and more partucularly to a mud flap assembly therefor.

Heretofore it has been the practice of manufacturers of load carrying vehicles, such as dump trucks, to exclude fenders over the rear wheels of the vehicle. Accordingly, oftentimes mud, stones, rocks, etc., were projected rearwardly thereby creating an undesireable condition. Attempts have been made to eliminate this undesireable condition by suspending mud flaps, or splash guards, from the vehicle immediately rearwardly of the rear wheels.

The provision of mud flaps, however, has been unsatisfactory in many respects. For example, upon raising the dump box for unloading, the mud flaps would contact the ground so that: if the vehicle were moved rearwardly, the rear wheels would run over the flaps; and if forwardly, the load would pin the flaps, resulting in the mud flaps being torn from their mountings. Therefore, the mud flaps would have to be frequently replaced, thereby increasing the cost and decreasing the reliability.

Moreover, in recent years the SAE recommended practice SAE J-321A set out the uniform tire coverage in terms of minimum structural requirements for fenders or the like when a vehicle is in normal position and when the specified maximum travel speed exceeds 15 miles per hour. Although the recommended practice is entitled "fenders," protection may be accomplished by other means: i.e., the peculiar structure of the vehicle, such as the dump box and/or attachments thereto. Accordingly, a mud flap of substantially flexible material may be included as a fender extension or as part of a fender.

The present invention complies with SAE J-321A recommended practice and avoids the heretofore undesireable condition by featuring a two-part mud flap assembly. An upper flap is suspended from the vehicle frame having its lower edge normally presented between the horizontal tangent of the vehicle tire and the center line thereof. A lower flap is mounted to a support element which extends transversely of the vehicle and is suspended therefrom by a plurality of flexible members. In normal position the upper edge portion of said lower flap is located immediately adjacent to and parallel with the lower edge portion of the upper flap. The support element is fixed adjacent its ends to one end of a pair of swingable arms located on opposite sides of the vehicle and being rockably connected to the frame. As will be further described in the detailed description, when the dump box is elevated, as in the situation where unloading takes place, the swingable arms rock downwardly a predetermined distance at which time they engage a stop for terminating the downward movement of said support element. In this manner, the lower mud flaps never touch the ground and, therefore, are not susceptible to being pinned under the rear wheels of the vehicle or buried under the dumping load.

BRIEF DESCRIPTION OF DRAWINGS

FIG. 1 is a side elevational view of a dump truck vehicle having a mud flap assembly consructed in accordance with and embodying the present invention.

FIG. 2 is a rear view with portions broken away to illustrate the mud flap assembly.

FIG. 3 is an enlarged fragmentary view illustrating the flexible connection of the upper mud flap to the vehicle dump box.

DESCRIPTION OF THE PREFERRED EMBODIMENT

Figure 4:
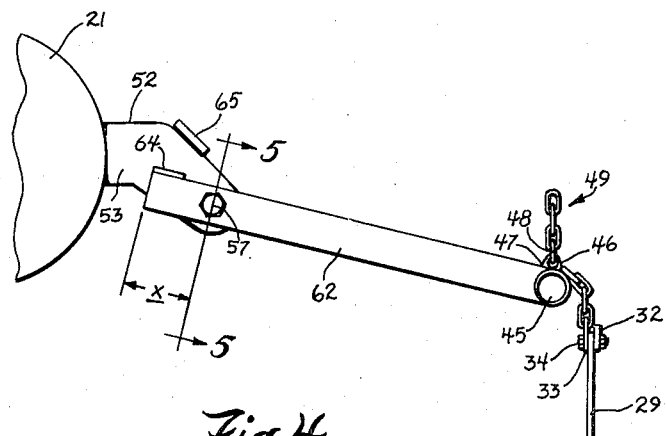
FIG. 4 is a vertical section taken on the line 4—4 of FIG. 2.
Figure 5:
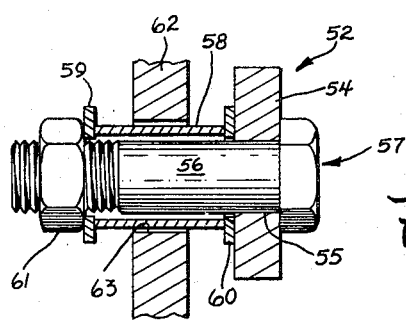
FIG. 5 is a vertical section taken on the line 5—5 of FIG. 4.

Referring now to the drawings wherein like reference characters designate like corresponding parts, there is shown in FIG. 1 a vehicle 20, such as a dump truck or the like, having a mobile frame 21, supported above ground $g$ by front and rear axles 22, 23, respectively, each having wheels, collectively designated W, rotatably mounted on their end portions in usual fashion. It will be understood that the rear axle 23 may have dual supporting wheels as illustrated in FIG. 2, single wheels, or tandem wheels with an auxiliary axle, without departing from the present invention.

Carried on said frame 21 is a cab 24 and a tiltable dump box 25 which is pivotally mounted thereto, as by a pivot pin 26, for movement between raised and lowered position responsive to the energization of convention hydraulic rams, as at 27, interconnecting the frame 21 and the tiltable dump box 25 at a point forwardly of said pivot pin 26. Said dump box 25 has a width substantially the same as the rear axle 23 and a rearward portion 25a which projects spacedly rearwardly beyond said rear wheels W to substantially overlie same. Suspended immediately rearwardly of the rear wheels W is a mud flap assembly A constructed in accordance with and embodying the present invention.

Said mud flap assembly A comprises upper and lower mud flaps 28, 29 each being fabricated from a resilient, substantially flexible material, such as the customary fabric impregnated rubber sheet. Both upper and lower mud flaps 28, 29 are reinforced in their upper portions by a pair of bands 30, 31 (FIG. 3) and 32, 33 (FIG. 4), respectively, which bands are presented on the opposed faces of the related mud flap and secured together as by a plurality of bolts 34.

Fixed to the reinforcing band 31 of said upper mud flap 28 are at least two chain links 35, 36 (FIG. 2) positioned spacedly inwardly from the respective end portions thereof. Received within each chain link 35, 36 is another chain link 37, 38, respectively, each of which is suitably fixed to the rearward portion 25a of dump box 25. The interengagement of chain lins 35, 37 and 36, 38 permits of limited swingability for reducing the likelihood that the upper mud flap 28 will shear or otherwise tear, and maintaining the upper mud flap 28 in substantially planar normal relationship with the horizontal tangent $t$ during movement of the dump box 25 between raised and lowered position. When the dump box 25 is in its lowered position, the lower end edge 28a of the upper mud flap 28 is presented spacedly below the horizontal tangent $t$ of the rear wheel W but spacedly upwardly of the center line $c$; and when the dump box 25 is in its raised position, said lower end edge 28a is spacedly above ground $g$ (FIG. 1).

Fixed to the forward face of band 33 of the lower mud flap 29 are a pair of end links 39, 40 of a chain 41, 42, respectively, being relatively short in length. Each chain 41, 42 incorporates another end link 43, 44, respectively, each of which is fixed to a support element S comprising an elongate transverse bar 45 extending across the width of the vehicle 20. Referring to FIG. 2 it will be observed that the mud flap assembly A is identical in every respect on the opposed sides of the vehicle 20. Therefore, only one side will be described, it being understood that like elements on the other side of vehicle 20 will be designated by like reference characters in order to facilitate understanding and to avoid unnecessary repetitive explanation.

Integrally formed with the transverse bar 45 spacedly inwardly from its end extremity is a lug 46 having an opening 47 for receiving one end portion 48 of a flexible member 49, such as a chain, the other end portion 50 being suitably fixed to the rearward portion 25a of said dump box 25. For added stability, auxiliary flexible members, as at 51, may be provided for connecting the transverse bar 45 with the rearward portion 25a of the dump box 25, as illustrated in FIG. 2.

Referring now to FIG. 4 of the drawings, there is shown a dog leg bracket 52 having one end portion 53 fixed to the frame 21 and the depending end portion 54 provided with an aperture 55 through which passes the shank 56 of a bolt 57. Received over the shank 56 is a spacer sleeve 58 having end peripheral edges engaging one face of opposed washers or flanges 59, 60, respectively, the other face of washer 59 engaging a nut 61 threadedly engaged with said shank 56, and the other face of said washer 60 engaging the dog leg bracket 52 to retain the spacer sleeve 58 in desired attitude. Slideably received over said spacer sleeve 58 is a swing arm 62 having an opening 63 of greater dimension than the diameter of spacer sleeve 58. The swing arm 62 is adapted to pivot about said spacer sleeve 58 at a point spacedly rearwardly from its forward end portion; said opening 63 being presented a predetermined distance x from the forward end edge of said swing arm 62. The washers 59, 60 serve as limits for the swing arm 62 when the latter moves laterally on said spacer sleeve 58.

The rearward end portion of said swing arm 62 is integrally formed with said transverse bar 45 at a location spacedly inwardly from the vehicle rear wheel W. The swing arm 62 thus rocks about spacer sleeve 58 responsive to the raising and lowering of the transverse bar 45, as will be further described hereinbelow.

Welded or otherwise secured to the forward end portion of said swing arm 62 is a stop 64 which is disposed in normal relationship to the plane of said swing arm 62 and adapted to engage a stop plate 65 fixed to said dog leg bracket 52 within the path of movement of said stop 64. Therefore, when the dump box 25 is raised, the transverse bar 45 will be proportionately lowered with said swing arm 62 rocking about said spacer sleeve 58 until the stop 64 engages the stop plate 65 whereupon downward movement of the transverse bar 45 will cease.

Figure 6:
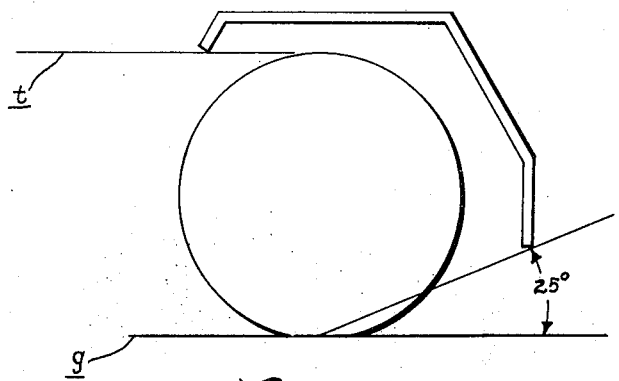
FIG. 6 is a side elevational view of a suggested fender arrangement in accordance with SAE specification.

Referring to FIG. 6, the minimum tire coverage requirements of the SAE recommended practice is illustrated. The SAE recommended practice provides that the minimum tire coverage required for all units on a level surface should have coverage rearwardly of the tire from a point above the horizontal tangent $t$ to a point spacedly from ground $g$ with a line connecting the center line of the tire at ground $g$ with the trailing end of the fender or mud flap. The present invention complies with the SAE recommended practice as the mud flap assembly A meets all the requirements of said recommended practice.

In addition to dump trucks, the SAE recommended practice is directed to scrapers, tractors, and trailer units. Therefore, it be understood that the mud flap assembly described hereinbelow also extends to said vehicles.

OPERATION

In operation, with the dump box 25 in its normal, lowered position, the upper and lower mud flaps 28, 29 cooperate to form an occluding plane for blocking any debrise thrown rearwardly by the rotation of said rear tires W. As the dump box 25 is pivoted about pivot pin 26 into raised position, the upper mud flap 28 will be lowered with the rearward portion 25a of the dump box 25 until its lower end edge 28a is spacedly above ground $g$, as illustrated in phantom lines in FIG. 1. The length of upper mud flap 28 is designed so that the lower end edge 28a will never touch the ground $g$. Simultaneously the lower mud flap 29 will be lowered through the lowering of transverse bar 45; the swing arm 62 pivoting about said spacer sleeve 58, until the stop 64 engages the stop plate 65 of the dog leg bracket 52 for precluding further downward movement of the transverse bar 45. At this juncture, the lower end edge 29a will be spacedly from the ground and the upper flap 28 and the lower flap 29 will be in substantially parallel overlapping relationship, as illustrated in phantom lines in FIG. 1.

Although the mud flap assembly A has been described as having a transverse bar 45 extending completely across the rear portion of the vehicle 20, it will be understood that separate flap supporting structure may be developed without departing from the spirit of the present invention. Moreover, although the upper and lower mud flaps 28, 29 are illustrated as a unitary construction for dual rear wheels, it will be understood that separate mud flaps for the respective rear wheels may be utilized as well.

Accordingly, the present invention complies with the SAE recommended practice and alleviates the hazards heretofore present. Additionally, through the use of the mud flap assembly A of the present invention, the lifetime of both upper and lower mud flaps will be enhanced as neither mud flap will be pinned by the rear wheels or buried under the load during dumping.

Having thus described our invention, what we claim and desire to obtain by Letters Patent is:

1. For use with a vehicle having a frame and a tilting dump box pivotally mounted on said frame for movement between lowered and raised position, and apparatus for supporting a mud flap comprising:

A support element carrying a mud flap;

First support means attachable to said dump box to carry said support element when said dump box is in said lowered position;

Second support means independent of said first support means attachable to said frame to carry said support element when said dump box is in raised position and to maintain said support element at a predetermined distance above ground.

2. The invention as defined in claim 1 and further characterized by:

Said first support means comprising at least one flexible member suspending said support element from said dump box so that the support element lowers and raises therewith.

3. The invention as defined in claim 1 and further characterized by:

Said second support means comprising a rockable member connected to said support element;

Means pivotally connecting said rockable member to said vehicle frame to permit the lowering of said rockable member with said support element;

Stop means on said frame for limiting downward movement of said rockable member after said support element has been lowered a predetermined distance as the dump box is moved into raised position for dumping.

4. The invention as defined in claim 1 and further characterized by:

Said rockable member comprising an arm having end portions, one end portion being fixed to said support element, the other end portion being free;

Said means pivotally connecting said rockable member to the frame including a bracket fixed to said frame and a pin interconnecting said arm with said bracket.

5. The invention as defined in claim 1 and further characterized by:

A stop plate carried by said bracket and presented within the path of movement of said arm, said arm being adapted to engage said stop plate after said support element has moved downward a predetermined distance.

6. The invention as defined in claim 1 and further characterized by said stop plate being located adjacent the free end portion of said arm.

7. The invention as defined in claim 1 and further characterized by:

A stop mounted on the free end portion of said arm and projecting normally outwardly therefrom, said stop being adapted to engage the stop plate of said bracket when the arm has swung through a predetermined arc.

8. The invention as defined in claim 1 and further characterized by:

A spacer sleeve received over said pin;

Flange means provided on the opposed ends of said spacer sleeve;

Said arm having an opening for receiving said spacer sleeve, said opening being of greater diameter than the diameter of said spacer sleeve for permitting said arm to move laterally therealong during rockable movement.

9. The invention as defined in claim 1 and further characterized by:

Said support element comprising an elongate transverse bar extending across said vehicle;

A mud flap presented on opposed ends of said transverse bar;

Said second support means comprising a pair of arms fixed to said bar at a point spacedly inwardly of said mud flaps;

Means rockably mounting each arm to said vehicle frame;

Stop means located within the path of movement of each arm for limiting downward movement thereof when said dump box is moved into raised position for dumping.

10. A mud flap assembly for attachment to a vehicle having a frame supported by wheels and a tilting dump box pivotally mounted to said frame for movement between raised and lowered position comprising:

An upper mud flap suspended from said dump box, said upper mud flap having a lower edge normally presented spacedly upwardly of the center line of said wheels;

A lower mud flap suspended from said dump box, said lower flap having an upper end edge presented in substantial horizontal alignment with said upper flap lower edge;

A support element connected to said upper end edge of said lower flap;

A rockable member having end portions, one end portion being fixed to said support element; the other end portion being free;

A bracket fixed to said frame;

Means pivotally mounting said rockable member to said bracket at a point spacedly from said free end portion;

A stop plate fixed to said bracket and presented in the arc of movement of said free end portion;

A stop fixed to said free end portion adapted for engagement with said stop plate to preclude downward movement of said support element after same has been lowered a predetermined distance.

* * * * *